United States Patent Office 3,630,936
Patented Dec. 28, 1971

3,630,936
DRAIN CLEANER
Robert E. Hill, Memphis, Tenn., assignor to Armour and Company, Chicago, Ill.
No Drawing. Filed Feb. 4, 1966, Ser. No. 525,105
Int. Cl. C11d 7/06, 7/12
U.S. Cl. 252—157
5 Claims

ABSTRACT OF THE DISCLOSURE

A composition providing heat when mixed with water, and a method for making the same. In this composition, aluminum particles and water soluble inorganic nitrate particles are bonded to the surface of alkali metal hydroxide particles.

---

This invention relates to an improved composition for the production of heat when mixed with water and to a method for making the same, and pertains more specifically to an improved drain-cleaner composition in dry solid form and to a method of making it.

It has previously been proposed to provide a drain-cleaning composition containing a mixture of solid particles of caustic soda, aluminum metal, and water soluble nitrates. However the several different kinds of particles in such compositions have a tendency to segregate during shipping and handling of the composition, leading to non-uniform effectiveness of the composition in use. Furthermore, despite the fact that the nitrate is intended to react with the nascent hydrogen to minimize the evolution of gaseous hydrogen produced by the reaction between aluminum metal and aqueous caustic solution, it has been found to be not so effective as desired.

One object of the present invention is to provide a heat-producing composition of the type described which when dissolved in water is capable of very rapid generation of heat with a minimum of turbulence from the evolution of hydrogen gas.

Another object is to provide such a composition which is stable and substantially free from tendency to segregation of the particles during storage for extended periods of time.

Sitll another object is to provide a composition of the type described which is resistant to moisture and which consequently is less likely to attack human skin when in contact with it for only short periods of time.

Other and further objects will be apparent from the description which follows.

The alkaline metal hydroxide particles which are one component of the composition of the present invention may consist of sodium hydroxide, potassium hydroxide, or the like, or mixtures thereof. These particles are preferably in the form of flakes or ground particles and preferably are as uniform as possible in particle size and shape. The maximum dimension of each particle must be at least 1/16 inch and should not exceed 3/16 inch.

The aluminum particles present in the composition must be sufficiently small to pass a thirty mesh screen (U.S. Standard Seive Series) and may be present either in the form of granules or in the form of leaf- or flake-type aluminum used as a pigment. Aluminum particles in the form of granules have an average maximum dimension of about 0.01 inch and in number are of the order of 25,000 per gram; in this size they pass freely through garbage disposal units without causing jamming. Leaf- or flake-type aluminum particles are even smaller. While aluminum alloys have been proposed for this purpose, such as alloys of aluminum with a small amount of copper and with trace amounts of other elements, and such alloys are included within the term "aluminum" as used in the present specification and claims, it is preferred that high purity aluminum be employed containing less than one percent of other metals.

The water soluble inorganic nitrate particles, which are believed to act as an oxidizing agent to react with the hydrogen evolved by interaction between the aluminum and the aqueous alkaline solution when the composition is dissolved in water must also be sufficiently small to pass a thirty mesh screen. Preferably at least about 15% by weight of the nitrate passes a two hundred mesh screen. While a variety of water soluble nitrates may be employed, alkali metal nitrates are preferred, such as sodium or potassium nitrate.

The particles of aluminum and of water soluble inorganic nitrate must be bonded to the surface of the alkaline metal hydroxide particles, for which purpose any suitable binder in the form of a coating on the hydroxide particles may be employed; the binder is preferably adherent to the several particles. The binder must be soluble in an aqueous solution of alkali metal hydroxide, and must be sufficiently thin and pervious to water so that the nitrate and the hydroxide may rapidly dissolve in water when exposed thereto. Preferably the binder is an organic resinous material which dissolves rapidly in aqueous alkali solutions. Rosin may be used, but it is preferred to employ an adduct of terpene and maleic anhydride. Such a terpene-maleic anhydride reaction product is available commercially under the trade name of "Petrex Acid." This acid is a Diels-Alder diene reaction product between a compound containing a carbon-carbon conjugated system and one containing a carbon-oxygen conjugated system. The acid is a stringy, yellow-amber colored mass which is mostly dibasic, has a molecular weight of approximately 215, and a softening point of 40°–50° C. Excellent results may be obtained by using as the binder a mixture of such adduct with up to twice its weight of aluminum resinate (the aluminum salt of the acids found in rosin); best results are obtained using such a mixture in which the proportion of adduct to resinate is from 2:1 to 1:2 by weight. The aluminum resinate appears to provide a dispersing agent when the composition is dissolved in water; its presence enhances the grease dispersing capability of the composition. In addition, its presence increases the storage stability of the product, particularly when the amount of binder is near the lower end of the useful range.

The relative proportions of the several components of the composition must be maintained within certain ranges for best results. From sixty to eighty-five parts by weight of alkali metal hydroxide may be used along with ten to thirty parts by weight of water soluble inorganic nitrate, six-tenths to six parts of aluminum particles and three to eight parts of binder. While flake-type aluminum may be used, as pointed out above, it has been found that any excess over about one part by weight of aluminum in such form is ineffective for producing heat since it tends to float out of the reactive solution and to be trapped in a layer of foam floating on the surface when the composition is used. If flake-type aluminum is the only aluminum present, it is preferred to maintain the proportion of the binder near the upper end of the useful range, i.e. in an amount of 5–8 parts by weight. When aluminum is present in granular form only, it may be effectively employed in amounts throughout the useful range and the binder also may be present in any amount throughout the useful range. Both granular and flake-type aluminum may be present in the same composition if desired, but it must be kept in mind that any excess of the latter above about one part is largely wasted except to the extent that it provides an attractive color for the composition before use. Sufficient binder should be employed to bond the particles of nitrate and of aluminum securely to the hydroxide particles in the form of a surface coating, but it is important to avoid using any more than the minimum amount of binder required for this purpose in order to avoid slowing down excessively the rate of evolution of heat when the composition is mixed with water. It is desirable that the coated hydroxide particles not be bonded to each other, so that the composition takes the form of a free-flowing granular material.

When a coloring material such as aluminum pigment, i.e. aluminum flake in the form of a paste is used, it may be applied to the coated hydroxide particles after all of the remaining ingredients have been mixed together. The small pigment particles are held on the surface of the coated hydroxide particles by an additional or final coating of antidusting material which may also be present on the surface of the coated hydroxide particles. The antidusting material must be dispersible in aqueous alkali and preferably is a vegetable oil such as linseed oil, castor oil, or soybean oil. Up to two parts by weight of aluminum pigment or even more may be used for the desired coloring together with up to two parts of antidusting material.

The composition of the present invention may be prepared by first dissolving the binder in a suitable volatile anhydrous solvent which is incapable of dissolving the other components of the composition. For best results sufficient solvent should be employed so that the total solids in the solution varies from forty percent to eighty percent by weight. The solution is then first mixed with the alkali metal hydroxide particles, after which the particles of aluminum and of water soluble nitrate are intermixed with the mass. After thorough mixing to produce a uniform distribution of the components, the volatile solvent is evaporated while continuing the mixing until a dry solid product in particulate form is obtained. The aluminum pigment paste, if used, and antidusting material may be mixed together and added last. If aluminum paste is used it may also be mixed into the composition before the solvent has evaporated, but it is preferably added after most of the nitrate has been mixed in; it may be added along with the last fourth of the nitrate for good results, but it is preferably added along with the vegetable oil after the volatile solvent has evaporated.

The following specific examples are intended to illustrate more clearly the nature of the present invention without serving as a limitation upon its scope.

EXAMPLE 1

There were dissolved in ten parts by weight of anhydrous acetone 2.2 parts by weight of terpene-maleic anhydride resinous adduct (Petrex Acid) and 1.8 parts of aluminum resinate (2.1 percent aluminum) with stirring. The resultant solution was mixed in a low shear type mixer with seventy-three parts by weight anhydrous sodium hydroxide in ground flake form, the particles having an average maximum dimension of approximately ⅛ inch. There was subsequently added to this mixture eighteen parts by weight of anhydrous sodium nitrate ground to pass a thirty mesh screen and 3.5 parts by weight of aluminum granules which passed a thirty mesh screen, and mixing was continued until all of the particles were uniformly distributed. The solvent was then allowed to evaporate while mixing continued, resulting in a dry solid composition in which the particles of nitrate and of aluminum were bonded to the surface of the hydroxide by means of the binder. There were then sprayed on the dry solid mass, while mixing was continued, a mixture of one part by weight of linseed oil and one part by weight of aluminum pigment paste (70% aluminum) to form a second outer coating on top of the original coating on each hydroxide particle.

A uniform mass of dry solid particulate material was obtained which could be stored for long periods of time without caking and without decomposition or discoloration of the binder. The composition was resistant to moisture and could be held in a palm of the hand for a substantial period of time without burning or irritation of the skin. When mixed with water the composition developed heat very rapidly, a mixture with seven parts by weight of water attaining a temperature of 95 to 100° C. within two to three minutes. The composition was found to be very effective in cleaning grease-plugged drains.

EXAMPLE 2

A solution was prepared by dissolving 5.6 parts by weight of the resinous adduct described in Example 1 in 1.4 parts of dry acetone. The solution was then mixed with 71.7 parts of ground flake sodium hydroxide and there was subsequently added eighteen parts of powdered sodium nitrate, as described in Example 1. After drying, a mixture of one part of linseed oil and one part of aluminum pigment paste (70% aluminum flakes) was sprayed onto the dry solid particles while mixing continued.

The resulting dry solid particulate material was nondusting, stable in storage, resistant to moisture, and when mixed with water it developed heat rapidly, a mixture of one part by weight of the composition with seven parts of water at room temperature reaching a temperature above 95° C. within three minutes.

EXAMPLE 3

There was dissolved in twelve parts by weight of acetone 3.9 parts of tall oil rosin. The solution was added to 73 parts of flake caustic, 20 parts of sodium nitrate, and 3 parts of aluminum granules while the solid particles were being agitated in a rotary mixer. After thorough mixing to coat the caustic particles the acetone was permitted to evaporate. A mixture of one part of raw linseed oil and one part of aluminum paste was then sprayed on the particulate mass while agitation continued. The resulting mass of silvery-colored particles exhibited the same desirable characteristics as the composition of Example 2.

EXAMPLE 4

A solution containing 5.6 parts of the resinous adduct of Example 1 and 1.4 parts of acetone was mixed with 73 parts of flake caustic in a rotary mixer, and evaporation of the acetone was allowed to begin. About 14 parts of powdered sodium nitrate was then added and mixing continued until the caustic particles were coated, after which 3.5 parts of aluminum granules were added followed by 4 more parts of sodium nitrate while mixing continued. After the coating of the caustic particles and evaporation of the acetone was completed, a mixture of 0.9 part linseed oil and 0.9 part of aluminum paste (70% aluminum) was added while agitation continued until the particles exhibited a uniform silvery color. The characteristics of the finished composition were similar to those of the product of Example 2.

Although specific embodiments of the invention have been described herein, it is not intended to limit the invention solely thereto but to include all of the obvious variations and modifications within the spirit and scope of the appended claims.

What is claimed is:

1. A composition providing heat when mixed with water consisting essentially of alkali metal hydroxide particles having bonded to the surface thereof particles of aluminum and particles of an alkali metal nitrate, the bonding material being selected from the group consisting of:
   (a) rosin
   (b) an adduct of terpene-maleic anhydride, and
   (c) a mixture of said adduct and aluminum resinate.

2. A composition according to claim 1 in which the components are present in the following proportions:

(a) 60 to 80 parts by weight of said alkali metal hydroxide particles,
(b) 10 to 30 parts by weight of said alkali metal nitrate particles,
(c) 0.6 to 6 parts by weight of said aluminum particles, and
(d) 4 to 8 parts by weight of said binder.

3. A composition according to claim 1 wherein said alkali metal hydroxide particles have an average maximum dimension from 1/16 to 3/16 inch, and said alkali metal nitrate particles and said aluminum particles are sufficiently small to pass a 30 mesh screen.

4. A composition according to claim 1 having an outer coating consisting essentially of aluminum pigment and a vegetable oil dispersible in aqueous alkali.

5. The method of making the composition of claim 1 comprising the steps of:
(a) dissolving said binder in a volatile anhydrous solvent which is incapable of dissolving the remaining particles of the composition,
(b) mixing said alkali metal hydroxide particles with said solution,
(c) mixing said alkali metal nitrate particles and said aluminum particles therewith, and
(d) evaporating said solvent.

References Cited
UNITED STATES PATENTS 2,356,443  8/1944  Bissinger _____ 252—158
3,077,455  2/1963  Racke _____ 252—157

LEON D. ROSDOL, Primary Examiner

W. E. SCHULZ, Assistant Examiner

U.S. Cl. X.R.

106—2; 134—2, 40; 252—188.3, 193